United States Patent
Lin et al.

(10) Patent No.: US 7,922,379 B2
(45) Date of Patent: Apr. 12, 2011

(54) BACKLIGHT MODULE

(75) Inventors: Wen-Hsin Lin, Miaoli County (TW);
Chien-Hung Chen, Taoyuan County (TW); Tsung-Fu Cheng, Taipei (TW);
Ren-Wei Huang, Hsinchu County (TW)

(73) Assignee: Au Optronics Corporation, Hsinchu (TW)

( * ) Notice: Subject to any disclaimer, the term of this patent is extended or adjusted under 35 U.S.C. 154(b) by 168 days.

(21) Appl. No.: 12/209,217

(22) Filed: Sep. 12, 2008

(65) Prior Publication Data
US 2010/0002431 A1    Jan. 7, 2010

(30) Foreign Application Priority Data

Jul. 3, 2008    (TW) ................................ 97125125 A (51) Int. Cl.
*F21V 19/00* (2006.01)
(52) U.S. Cl. ..................... 362/614; 362/634; 362/217.14
(58) Field of Classification Search .................. 362/614, 362/634, 225, 260, 217.14
See application file for complete search history.

(56) References Cited

U.S. PATENT DOCUMENTS

| | | | | |
|---|---|---|---|---|
| 7,270,467 B2 * | 9/2007 | Kim | ............................. | 362/634 |
| 7,600,889 B2 * | 10/2009 | Fukuda | ........................ | 362/225 |
| 7,604,390 B2 * | 10/2009 | Zhang et al. | .................. | 362/634 |
| 2006/0023472 A1 * | 2/2006 | Liu et al. | ....................... | 362/614 |
| 2006/0092660 A1 * | 5/2006 | Tajiri | ............................ | 362/559 |

FOREIGN PATENT DOCUMENTS

| | | |
|---|---|---|
| CN | 2783370 | 5/2006 |
| CN | 101109868 | 1/2008 |
| JP | 2007073527 | 3/2007 |

OTHER PUBLICATIONS

"2nd Office Action of China counterpart application", issued on Mar. 15, 2010, p. 1-p. 4.

* cited by examiner

*Primary Examiner* — Jong-Suk (James) Lee
*Assistant Examiner* — Peggy A. Neils
(74) *Attorney, Agent, or Firm* — Jianq Chyun IP Office (57) ABSTRACT

A backlight module including a back cover, a reflector, a lamp supporter, and a number of lamps is provided. The back cover includes a number of holes, an inner face, and an outer face. The reflector is disposed on the inner face and has a number of openings. The openings expose parts of the holes. The lamp supporter has a base substrate and a number of carriers that are connected to the base substrate. The base substrate is assembled to the outer face of the back cover, and the carriers penetrate the holes of the back cover and the openings of the reflector. The lamps are disposed in the carriers, such that the lamps and the base substrate are located at two opposite sides of the back cover.

12 Claims, 9 Drawing Sheets

BACKLIGHT MODULE

CROSS-REFERENCE TO RELATED APPLICATION

This application claims the priority benefit of Taiwan application serial no. 97125125, filed on Jul. 3, 2008. The entirety of the above-mentioned patent application is hereby incorporated by reference herein and made a part of specification.

BACKGROUND OF THE INVENTION

1. Field of the Invention

The present invention relates to a backlight module structure, and more particularly, to an arrangement of a lamp supporter in a backlight module.

2. Description of Related Art

With an advancement of technologies, digital devices including mobile phones, digital cameras, digital video cameras, notebook computers, and desktop computers have been developed to comply with requirements for easy operation, multiple functions, and fantastic exterior design. Using said IT products results in indispensability of display screens acting as man-machine interfaces, and the display screens of said products bring much convenience. Among the products, a liquid crystal display (LCD) apparatus has become a mainstream display apparatus. However, because an LCD panel of the LCD apparatus is not equipped with a self-illuminating function, a backlight module must be disposed underneath the LCD panel to provide a light source for display.

Figure 1:
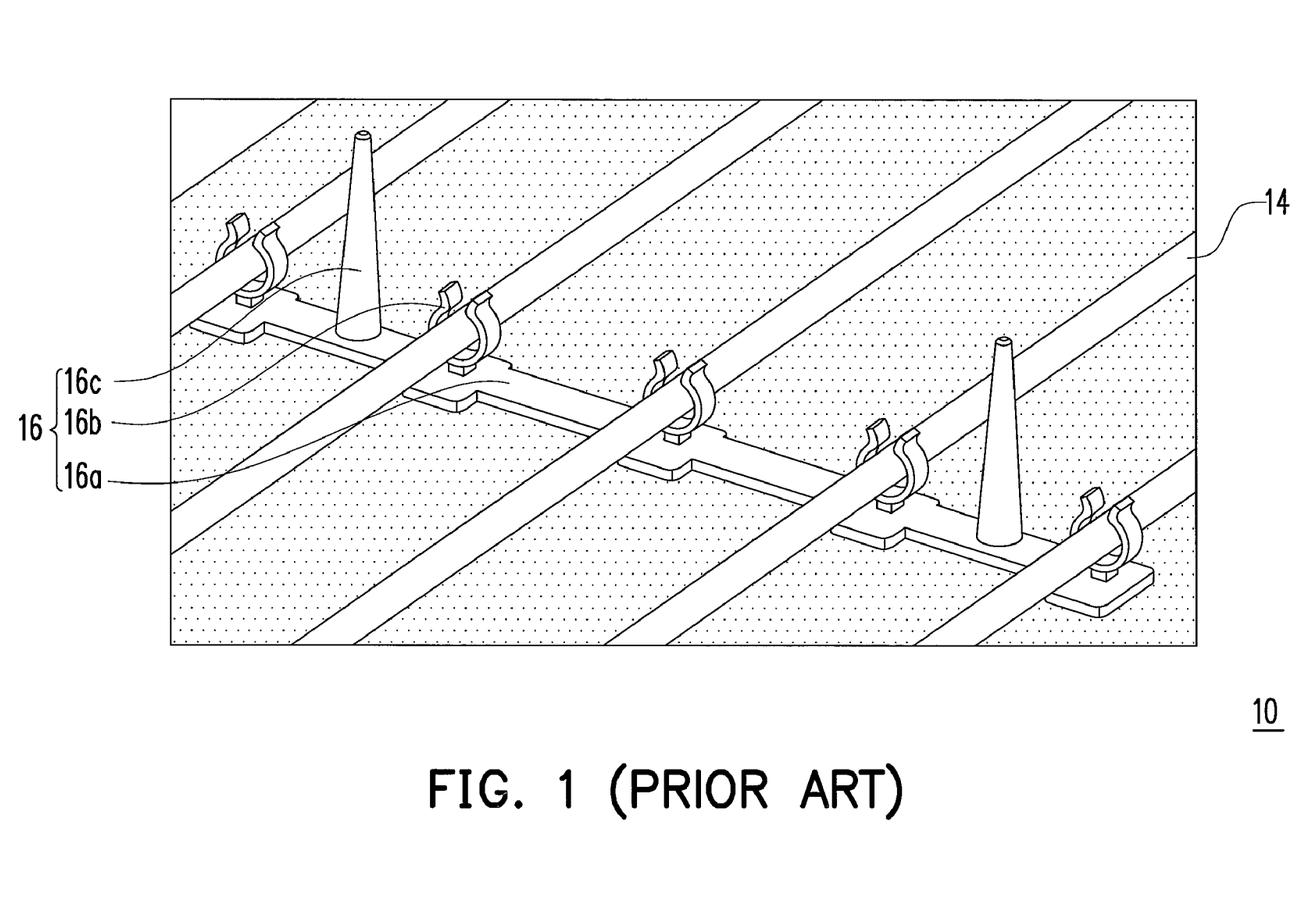
FIGS. 1 and 2 are schematic views illustrating a conventional backlight module.
Figure 2:
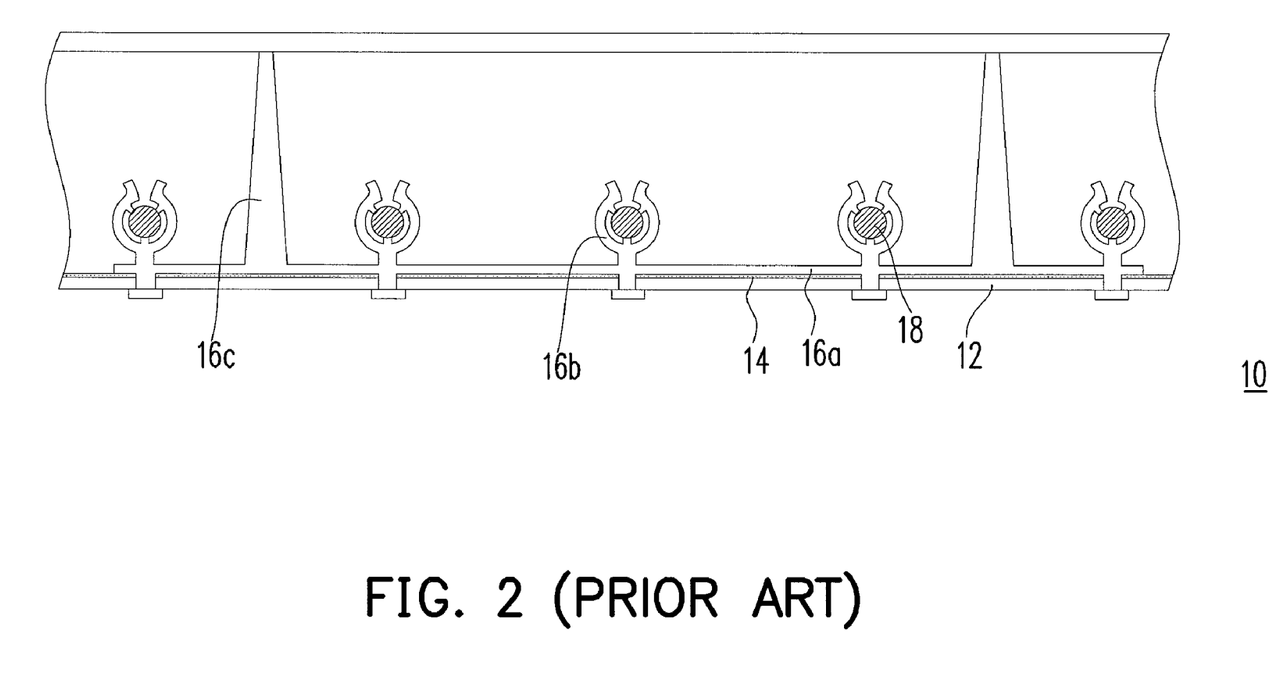

FIGS. 1 and 2 are schematic views illustrating a conventional backlight module. Referring to FIGS. 1 and 2, a backlight module 10 includes a back cover 12, a reflector 14, a lamp supporter 16, and a plurality of lamps 18. The reflector 14 and the lamp supporter 16 are both disposed on the back cover 12. The lamp supporter 16 includes a base substrate 16a, a plurality of lamp clamping members 16b connected to the base substrate 16a, and a supporting element 16c connected to the base substrate 16a. The lamps 18 are disposed in the lamp clamping members 16b.

It can be deduced from the above that the base substrate 16a of the lamp supporter 16 shields a part of the reflector 14, thus posing a negative impact on light emission of the backlight module 10. Hence, light emission of the conventional backlight module 10 is not quite satisfactory. In order to enhance light emission of the backlight module 10, a trench capable of accommodating the base substrate 16a can be formed on the back cover 12, so as to allow the reflector 14 to be disposed on a planar surface. However, the additional disposition of the trench complicates the fabrication of the back cover 12. In addition, the backlight module 10 is not apt to be miniaturized because the base substrate 16a is required to be disposed within the back cover 12. That is to say, the thickness of the backlight module 10 needs to be at least greater than the entire height of the lamp supporter 16.

SUMMARY OF THE INVENTION

The present invention is directed to a backlight module in which lamps and a base substrate of a lamp supporter are disposed at respective sides of a back cover, such that a reflector can be flatly adhered to the back cover and that uniform light can be provided by a backlight source.

In the present invention, a backlight module including a back cover, a reflector, a lamp supporter, and a plurality of lamps is provided. The back cover includes a plurality of holes, an inner face, and an outer face. The reflector is disposed on the inner face and has a plurality of openings. The openings expose parts of the holes. The lamp supporter has a base substrate and a plurality of carriers. The carriers are connected to the base substrate, and the base substrate is assembled to the outer face of the back cover. The carriers penetrate the holes of the back cover and the openings of the reflector. In addition, the lamps are disposed in the carriers, such that the lamps and the base substrate are located at two opposite sides of the back cover.

In an embodiment of the present invention, each of the carriers includes a C-shaped clamping member and a connection portion. The connection portions are connected between the base substrate and the C-shaped clamping members and positioned within the holes of the back cover and the openings of the reflector. Openings of the C-shaped clamping members are away from the connection portions, and the lamps are disposed within the C-shaped clamping members.

In an embodiment of the present invention, the holes are linearly arranged or alternately arranged.

In an embodiment of the present invention, each of the holes includes a first region, a second region, and a third region. The third region is connected between the first region and the second region. In an extending direction of an axis of each of the first region, the second region, and the third region, the maximum width of the first region is greater than the maximum width of the second region, and the maximum width of the second region is greater than the maximum width of the third region.

In an embodiment of the present invention, the reflector further includes a plurality of cutting lines substantially forming a plurality of U-shaped regions to surround each of the holes, respectively. The openings are disposed at bottoms of the U-shaped regions.

In an embodiment of the present invention, the backlight module further includes a plurality of supporting elements disposed between parts of the carriers, and the supporting elements are connected to the base substrate.

In an embodiment of the present invention, each of the supporting elements includes a post and a neck. The neck is connected between the post and the base substrate, and the neck passes parts of the holes of the back cover and parts of the openings of the reflector.

In an embodiment of the present invention, the backlight module further includes at least an optical film disposed on the supporting elements.

In an embodiment of the present invention, a distance from the centers of the lamps to the reflector is less than 3.2 mm.

In an embodiment of the present invention, the inner face and the outer face of the back cover are planar surfaces.

In an embodiment of the present invention, the base substrate has a bar shape.

In an embodiment of the present invention, the reflector further includes a plurality of cutting lines and a virtual bending line. The cutting lines and the virtual bending line substantially form a rectangular region to surround all of the holes, and the openings are connected to the rectangular region. Practically, the openings are, for example, disposed within the rectangular region and correspondingly connected to one of the cutting lines. In an alternative, the openings are disposed outside the rectangular region and correspondingly connected to one of the cutting lines.

In the backlight module of the present invention, the lamps and the base substrate of the lamp supporter are disposed at the respective sides of the back cover, and therefore the reflector can be flatly adhered to the inner face of the back cover. As such, the flat reflector is able to achieve favorable reflection, such that light emitted by the backlight module can be uniformed to a better extent. In addition, the design of the lamp supporter of the present invention is conducive to reduction of the distance between the lamps and the back cover, such that the backlight module of the present invention is miniaturized.

In order to make the aforementioned and other objects, features and advantages of the present invention more comprehensible, several embodiments accompanied with figures are described in detail below.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DESCRIPTION OF EMBODIMENTS

Figure 3A:
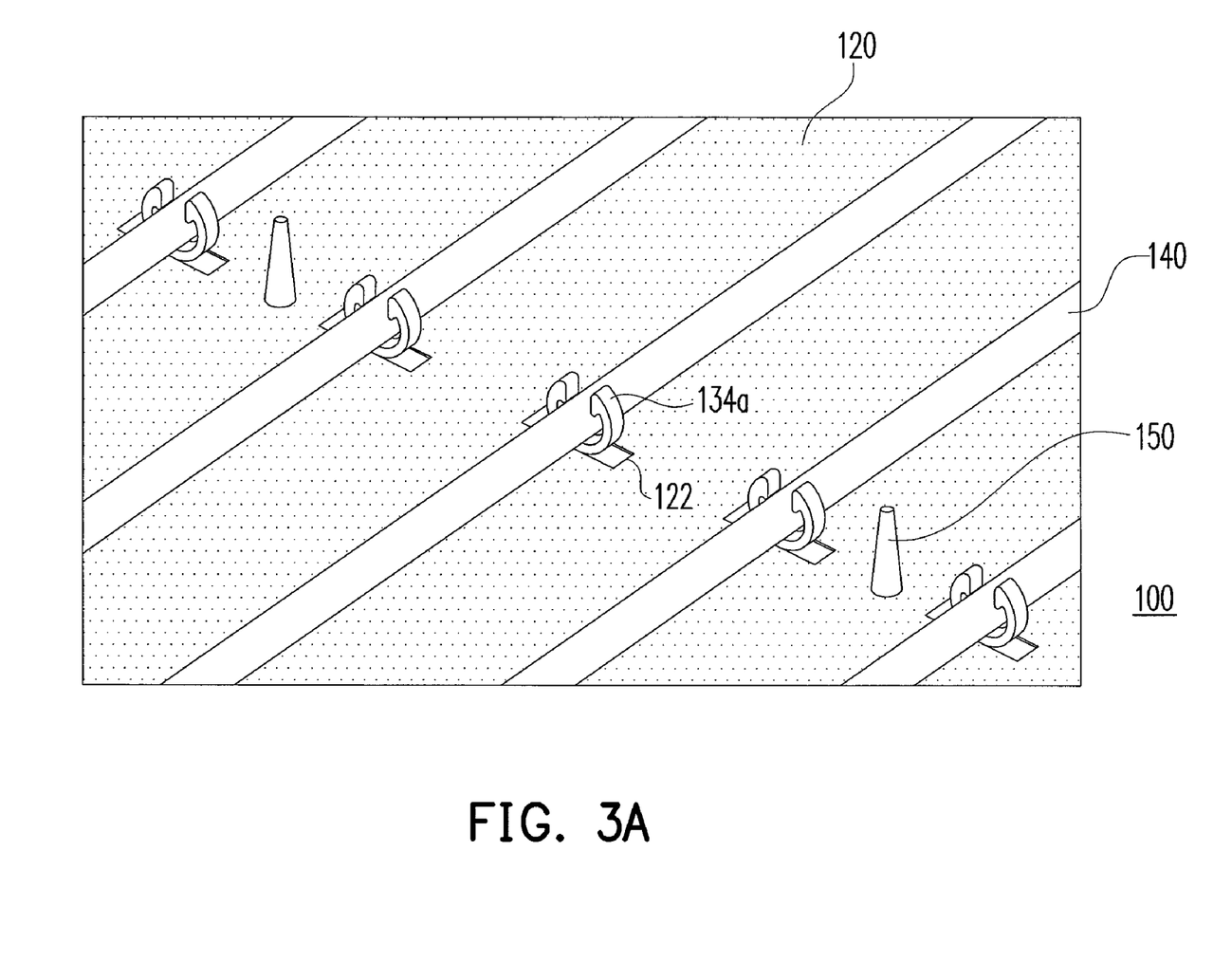
FIGS. 3A and 3B are schematic views illustrating a backlight module according to an embodiment of the present invention. Here, FIG. 3A merely depicts certain components.
Figure 3B:
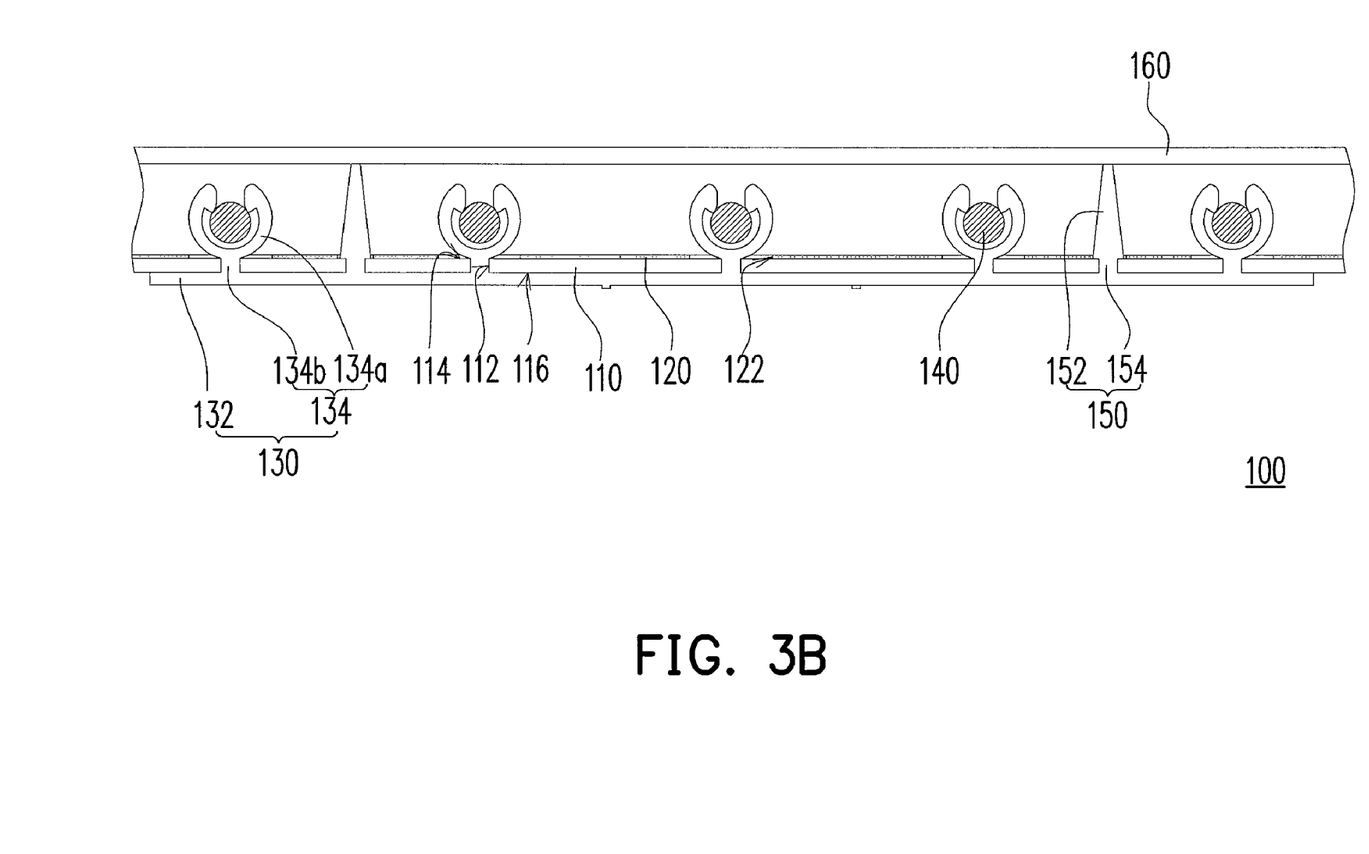

FIGS. 3A and 3B are schematic views illustrating a backlight module according to an embodiment of the present invention. Here, FIG. 3A merely depicts certain components. Referring to FIGS. 3A and 3B, a backlight module 100 includes a back cover 110, a reflector 120, a lamp supporter 130, and a plurality of lamps 140. The back cover 110 includes a plurality of holes 112, an inner face 114, and an outer face 116. The reflector 120 is disposed on the inner face 114 and has a plurality of openings 122. The openings 122 expose the holes 112. The lamp supporter 130 has a base substrate 132 and a plurality of carriers 134. The carriers 134 are connected to the base substrate 132, and the base substrate 132 is assembled to the outer face 116 of the back cover 110. In detail, the carriers 134 pass through the holes 112 of the back cover 110 and the openings 122 of the reflector 120, such that the lamp supporter 130 is fixed onto the back cover 110. Besides, the lamps 140 are disposed in the carriers 134. The lamps 140 and the base substrate 132 are respectively disposed at an inner side and at an outer side of the back cover 110.

In general, if the base substrate 132 of the lamp supporter 130 is disposed on the inner face 114 of the back cover 110, the reflector 120 cannot be flatly disposed on the inner face 114. Thus, the design of the base substrate 132 on the inner face 114 poses a negative impact on light emission of the backlight module 100. In order to flatly adhere the reflector 120 to the inner face 114, a trench formed on the back cover 110 for accommodating the base substrate 132 has been proposed in the pertinent art. However, the additional disposition of the trench complicates the fabrication of the back cover 110. Namely, a punching process may need to be additionally performed during the fabrication of the back cover 110. In light of the above, the lamps 140 and the base substrate 132 are disposed at the respective sides of the back cover 110 according to the present embodiment. As such, the inner face 114 of the back cover 110 remains planar, and the reflector 120 can then be flatly disposed on the inner face 114, which gives rise to an improvement of the light emission of the backlight module 100 and a solution to aforesaid issues.

Specifically, each of the carriers 134 includes a C-shaped clamping member 134a and a connection portion 134b. The connection portions 134b are connected between the base substrate 132 and the C-shaped clamping members 134b and positioned within the holes 112 of the back cover 110 and the openings 122 of the reflector 120. Openings of the C-shaped clamping members 134a are away from the connection portions 134b, and the lamps 140 are disposed within the C-shaped clamping members 134a. It is certain that the design of the carriers 134 is not limited in the present invention. Namely, various designs can also be applied to the carriers 134 in other embodiments. On the other hand, according to the present embodiment, the base substrate 132 has a bar-shaped design, which is, however, not limited in the present invention.

Note that the height of the connection portions 134b in the lamp supporter 130 can exactly be the thickness of the back cover 110 according to the present embodiment. Thereby, the distance between the lamps 140 and the back cover 110 can be appropriately reduced, such that the backlight module 100 of the present invention is able to comply with the requirement of miniaturization. For instance, the distance from the centers of the lamps 140 to the reflector 120 is 5.4 mm, and said distance can be less than 3.2 mm in the present embodiment. Practically, the minimum distance from the centers of the lamps 140 to the reflector 120 can be equal to the total of the radius of the lamps 140 and the thickness of the C-shaped clamping members 134a.

Besides, the backlight module 100 further includes a plurality of supporting elements 150 and at least an optical film 160. The optical film 160 is, for example, a diffusion plate, a brightness enhancement film, and so forth. The supporting elements 150 are disposed between parts of the carriers 134 and connected to the base substrate 132. Each of the supporting elements 150 includes a post 152 and a neck 154. The neck 154 is connected between the post 152 and the base substrate 132. Besides, the necks 154 pass parts of the holes 112 of the back cover 110 and parts of the openings 122 of the reflector 120. In other words, since the necks 154 are fastened in the holes 112 according to the present embodiment, the posts 152 and the base substrate 132 can be positioned at opposite sides of the back cover 110, respectively. In addition, the base substrate 132 is not required to be disposed on the inner face 114, which is conducive to adhesion of the reflector 120. That is to say, the design of the supporting elements 150 in the present embodiment aims at supporting the optical film 160 or other components to be disposed on the optical film 160 in subsequent manufacturing processes, for example.

According to the present embodiment, the base substrate 132 of the lamp supporter 130 is disposed on the outer face 116 of the back cover 110, and thus it is not necessary in the present embodiment to form a trench structure on the back cover 110 for accommodating the base substrate 132. Namely, the back cover 110 of the present embodiment has the planar inner face 114 and the planar outer face 116. As such, the design of the backlight module 100 of the present embodiment results in simplifying the fabrication of the back cover 110 and increasing an area occupied by the reflector 120. Additionally, in order to be commensurate to the structural design of the lamp supporter 130, the width of the necks 154 is, for example, less than the maximum width of the posts 152, and the width of the connection portions 134b is, for example, less than the width of the C-shaped clamping members 134a, so as to prevent the lamp supporter 130 from sliding or being loosened.

Figure 4A:
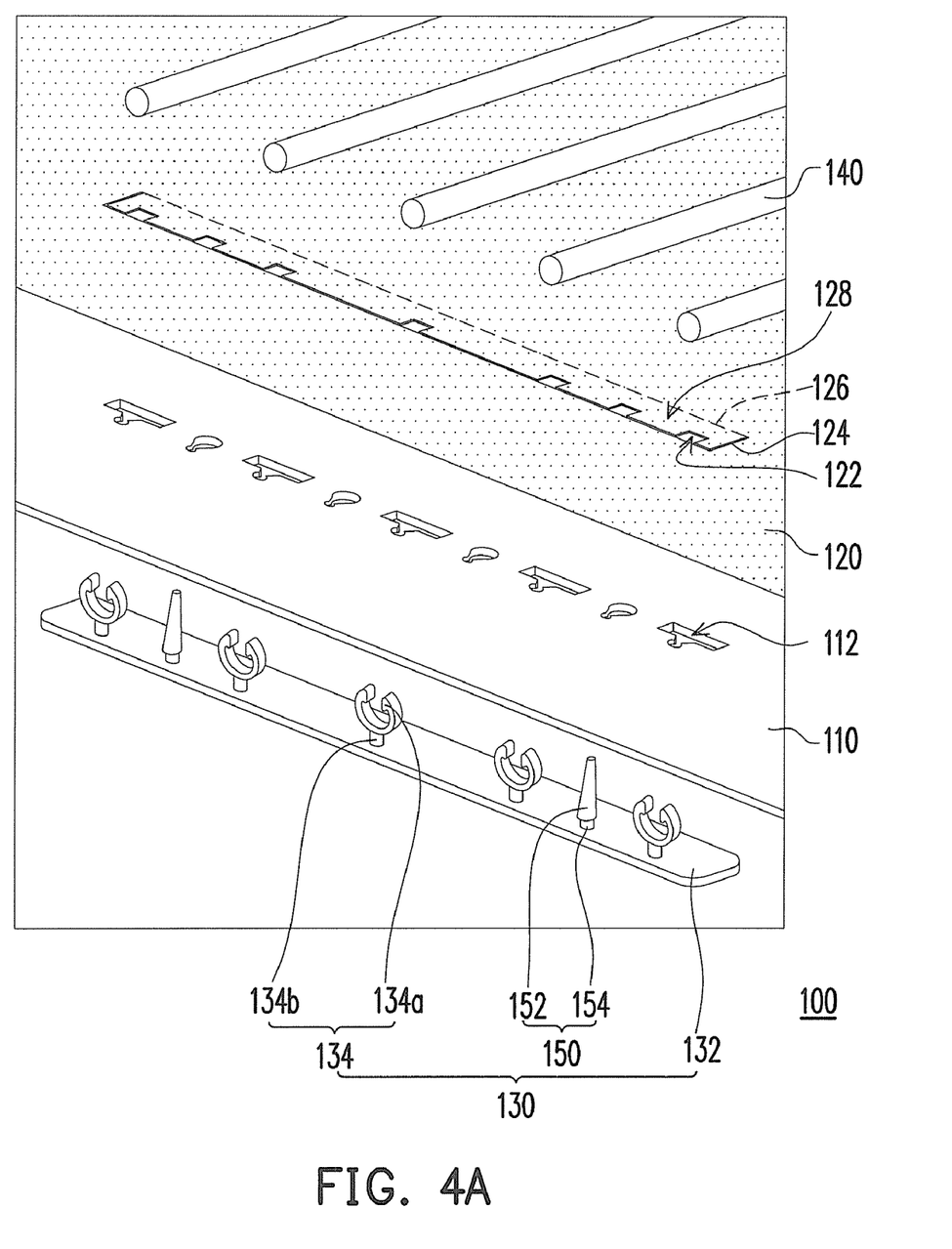
FIGS. 4A and 4B are exploded views illustrating a backlight module according to an embodiment of the present invention.
Figure 4B:
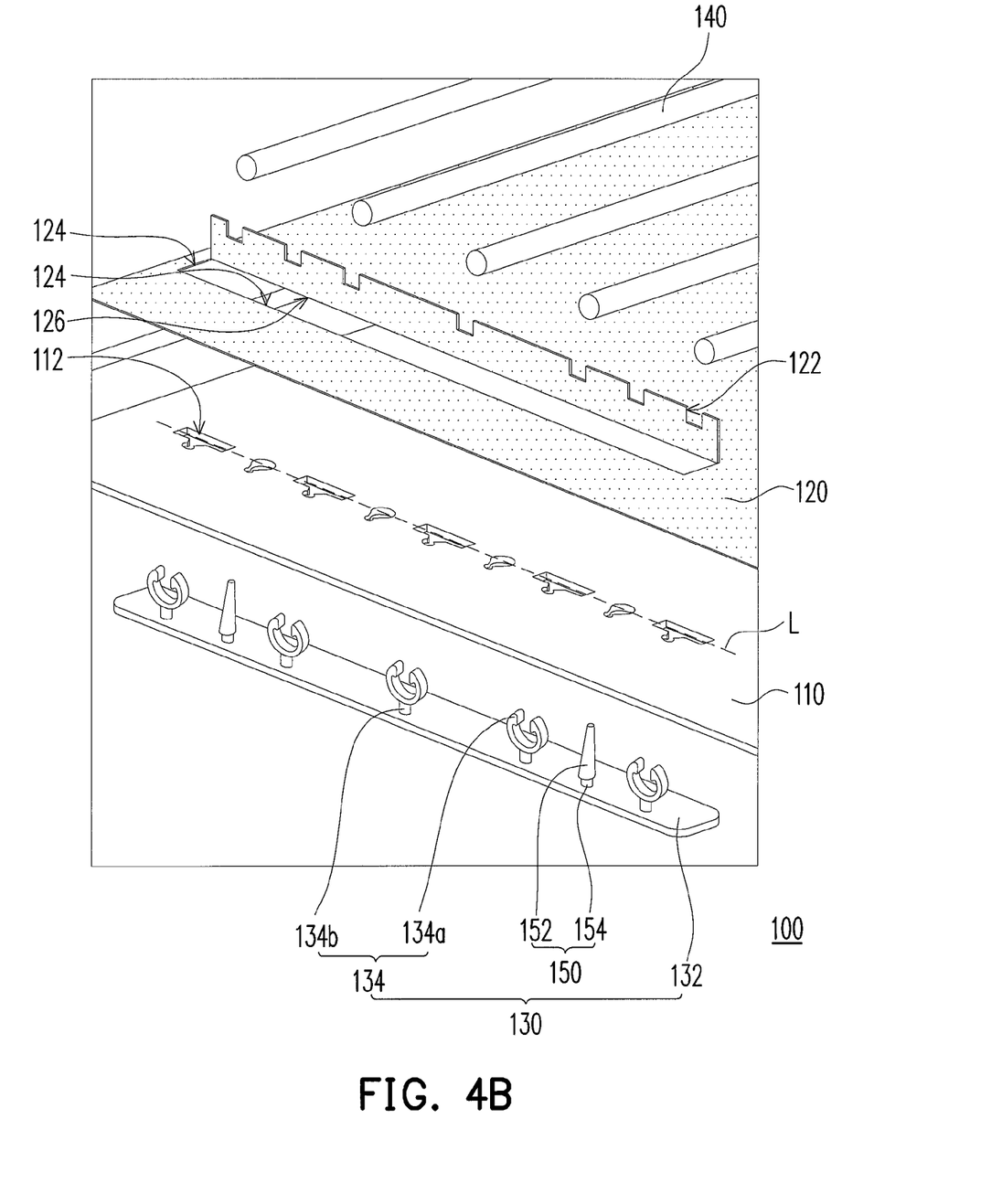

To further elaborate the present invention, please refer to FIGS. 4A and 4B that are exploded views illustrating a backlight module according to an embodiment of the present invention. In FIGS. 4A and 4B, the lamps 140, the reflector 120, the back cover 110, and the lamp supporter 130 are arranged from top to bottom. The lamp supporter 130 has one base substrate 132 and a plurality of carriers 134. Each of the carriers 134 includes one C-shaped clamping member 134a and one connection portion 134b. The connection portions 134b are connected between the base substrate 132 and the C-shaped clamping members 134a. In practice, the reflector 120 further includes a plurality of cutting lines 124 and a virtual bending line 126. The cutting lines 124 and the virtual bending line 126 substantially form a rectangular region 128 to surround all of the holes 112. The openings 122 are connected to the rectangular region 128. In addition, the openings 122 are disposed within the rectangular region 128 and correspondingly connected to one of the cutting lines 124.

It should be mentioned that the virtual bending line 126 in the backlight module 100 is not an actual line segment but a simulated line segment set for facilitating an assembling process. During the assembly of the backlight module 100, the virtual bending line 126 is expected to be bent or deformed, such that a region surrounded by the cutting lines 124 is folded for facilitating the assembly of the lamp supporter 130. Moreover, after the assembly of the backlight module 100 is completed, the virtual bending line 126 would revert back to the original planar state.

When the backlight module 100 is assembled, the carriers 134 of the lamp supporter 130 and the supporting elements 150 pass through the holes 112 and are securely fixed into the holes 112. Here, the base substrate 132 and the C-shaped clamping members 134a are respectively located at the two opposite sides of the back cover 110, and so are the base substrate 132 and the posts 152 of the supporting elements 150. On the other hand, the connection portions 134b and the necks 154 are, for example, fastened in parts of the holes 112.

After that, the reflector 120 is disposed on the back cover 110. Since the lamp supporter 130 is already assembled to the back cover 110, the reflector 120 is, for example, required to be first folded along the virtual bending line 126 at the time of adhering the reflector 120, which is shown in FIG. 4B. In the present embodiment, the openings 122 are disposed within the rectangular region 128 and, therefore, the folded part of the reflector 120 has a zigzag edge, for example. Next, the back cover 110 is covered by the folded part of the reflector 120, and the openings 122 of the reflector 120 expose parts of the holes 112. In other words, the openings 122 surround the connection portions 134b and the necks 154.

Thereafter, the lamps 140 are disposed within the C-shaped clamping members 134a, so as to complete the assembly of the backlight module 100. Thanks to said assembling process and said structural design, the reflector 120 can be flatly disposed on the back cover 110, so as to ensure better light emission of the backlight module 100. It is for sure the assembling process of the backlight module 100 includes more steps than those discussed above. In other embodiments, the reflector 120 can also be adhered to the back cover 110 at first, and then the lamp supporter 130 is assembled to the back cover 110.

Figure 4C:
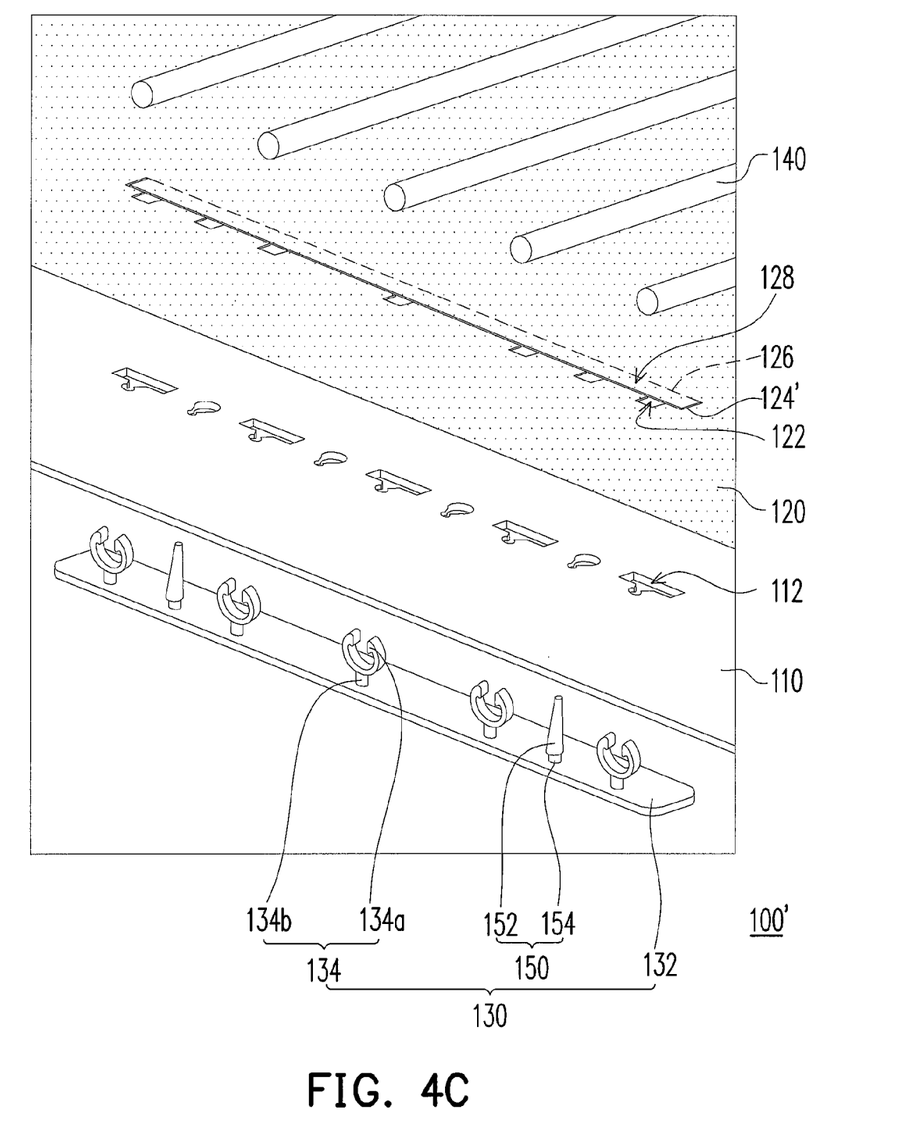
FIG. 4C is an exploded view illustrating a backlight module according to another embodiment of the present invention.

FIG. 4C is an exploded view illustrating a backlight module according to another embodiment of the present invention. Referring to FIG. 4C, a backlight module 100' is similar to the backlight module 100, while the design of cutting lines 124' is different from the design of the aforesaid cutting lines 124. The openings 122 are, for example, disposed outside the rectangular region 128 surrounded by the cutting lines 124' and the virtual bending line 126, but the openings 122 are still correspondingly connected to one of the cutting lines 124'. Thereby, during the assembly of the backlight module 100', the openings 122 are not folded when the rectangular region 128 surrounded by the cutting lines 124' and the virtual bending line 126 is folded. It is certain that the openings 122 can be partially disposed within the rectangular region 128 surrounded by the cutting lines 124' and the virtual bending line 126, and partially disposed outside the rectangular region 128, which is not limited in the present invention.

Figure 5:
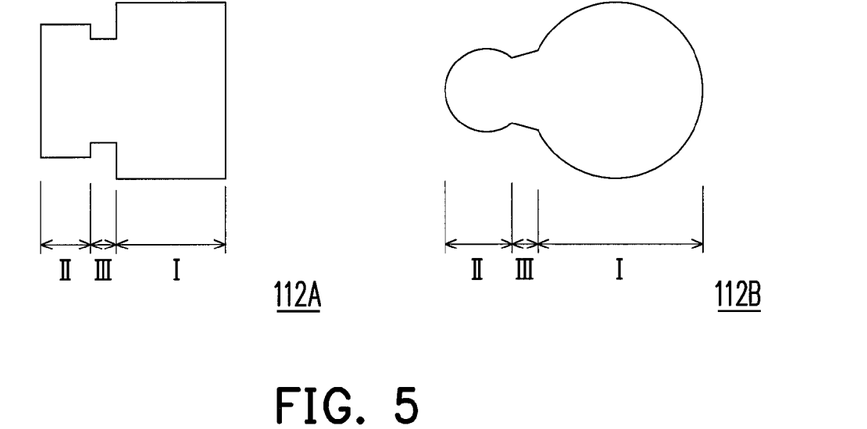
FIG. 5 is a schematic view illustrating holes of a back cover according to an embodiment of the present invention.

Particularly, the holes 112 must be designed for accommodating the C-shaped clamping members 134a and the posts 152 and fastening the connection portions 134b and the necks 154, so as to facilitate the assembling process of the backlight module 100. Accordingly, the following design of the holes 112 is proposed, which is, however, not limited in the present invention. FIG. 5 is a schematic view illustrating holes of a back cover according to an embodiment of the present invention. Referring to FIG. 5, a hole 1 12A and a hole 112B include a first region I, a second region II, and a third region III. The third region III is connected between the first region I and the second region II. Referring to FIGS. 4B and 5, in the present embodiment, the holes 112 are, for example, arranged along a straight line L. Besides, in an extending direction of an axis of each of the first region, the second region, and the third region, the maximum width of the first region I is greater than the maximum width of the second region II, and the maximum width of the second region II is greater than the maximum width of the third region III.

During the assembly of the backlight module 100, the lamp supporter 130 is moved upward to be engaged in the first region I of the hole 112A or of the hole 112B of the back cover 110. Hence, the dimension of the first region I in the hole 112A or in the hole 112B is, for example, sufficient for allowing the C-shaped clamping member 134a and the post 152 to pass through the first region I in the hole 112A or the hole 112B. After the C-shaped clamping member 134a and the post 152 pass the hole 112A or the hole 112B, the connection portion 134b and the neck 154 are still positioned in the first region I of the hole 112A or the hole 112B. After that, the lamp supporter 130 is continuously pushed toward the second region II, such that the lamp supporter 130 passes through the third region III and enters into the second region II. Here, the dimension of the second region II in the hole 112A or in the hole 112B is, for example, exactly suitable for accommodating the connection portion 134b and the neck 154. Besides, in order to fasten the lamp supporter 130 and to prevent the lamp supporter 130 from being loosened, the maximum width of the third region III is, for example, slightly less than the maximum width of the second region II. Certainly, the dimension of the holes 112 in the present embodiment is merely exemplary and should by no means limit the scope of the present invention. In other embodiments, various dimensions of the holes 112 which allow the lamp supporter 130 to be securely fixed to the back cover 110 can all be applied in the backlight module 100.

Based on the above, spaces in the reflector 120 are merely reserved for forming the openings 122 accommodating the connection portions 134a and the necks 154. Hence, in comparison with the conventional backlight module, the reflector 120 is distributed to a great extent in a relatively flat manner. Thereby, light emitted from the backlight module 100 of the present invention can be reflected by the reflector effectively and uniformly. Compared with the conventional backlight module, the backlight module 100 of the present embodiment is able to provide light that can be distributed in a relatively uniform manner.

Figure 6A:
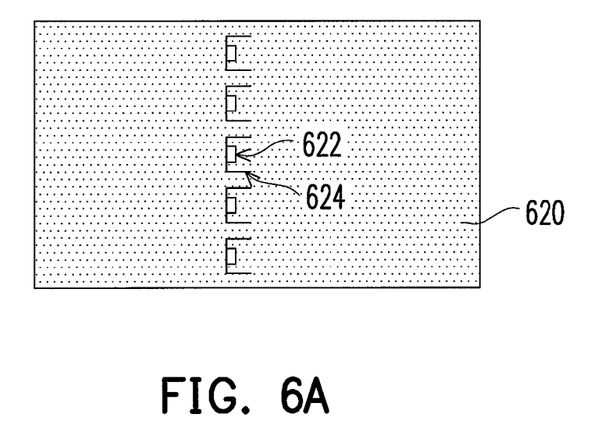
FIGS. 6A and 6B illustrate a design of a reflector of another backlight module according to the present invention.
Figure 6B:
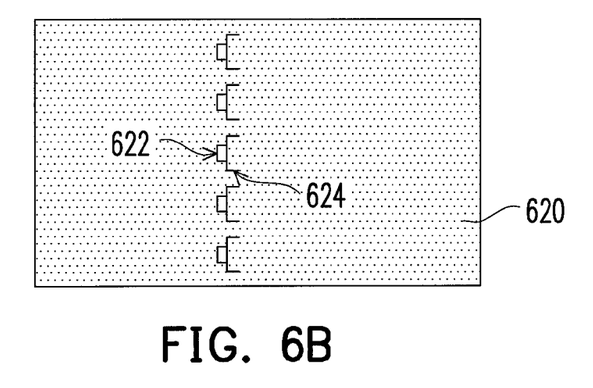

Besides, the design of the reflector 120 is not limited to those described hereinbefore. FIGS. 6A and 6B illustrate a design of a reflector and a design of a back cover in another backlight module according to the present invention. Referring to FIG. 6A, in a reflector 620, cutting lines 624 constitute a plurality of U-shaped traces, for example, and openings 622 are disposed at bottoms of the U-shaped traces, for example. Namely, as the reflector 620 is applied in the backlight module 100 depicted in FIG. 4A, the cutting lines 624 of each of the U-shaped traces in the reflector 620 surround one of the holes 112. Certainly, the cutting lines 624 of each of the U-shaped traces can surround two or more holes 112 in other embodiments, which is not limited in the present invention. Moreover, as shown in FIG. 6B, the openings 622 can also be disposed outside of a region surrounded by the cutting lines 624 of the U-shaped traces, which is also not limited in the present invention.

It should be mentioned that more than one lamp supporter 130 can be disposed in the backlight module 100 depicted in FIGS. 4A and 4B. Accordingly, the design of the back cover 110 and the design of the reflector 120 can vary upon the number and the position of the lamp supporter 130. For instance, components in different lamp supporters 130 can be alternately arranged, and the back cover 110 and the reflector 120 must be designed in line with the alternately-arranged components.

Figure 7A:
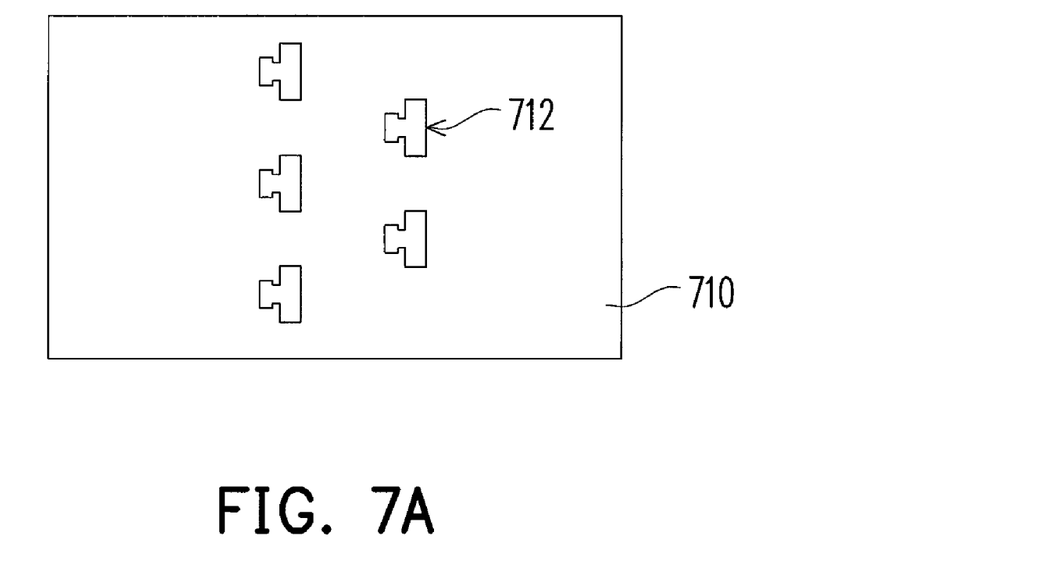
FIGS. 7A and 7B illustrate a back cover and a reflector of a backlight module according to another embodiment of the present invention.
Figure 7B:
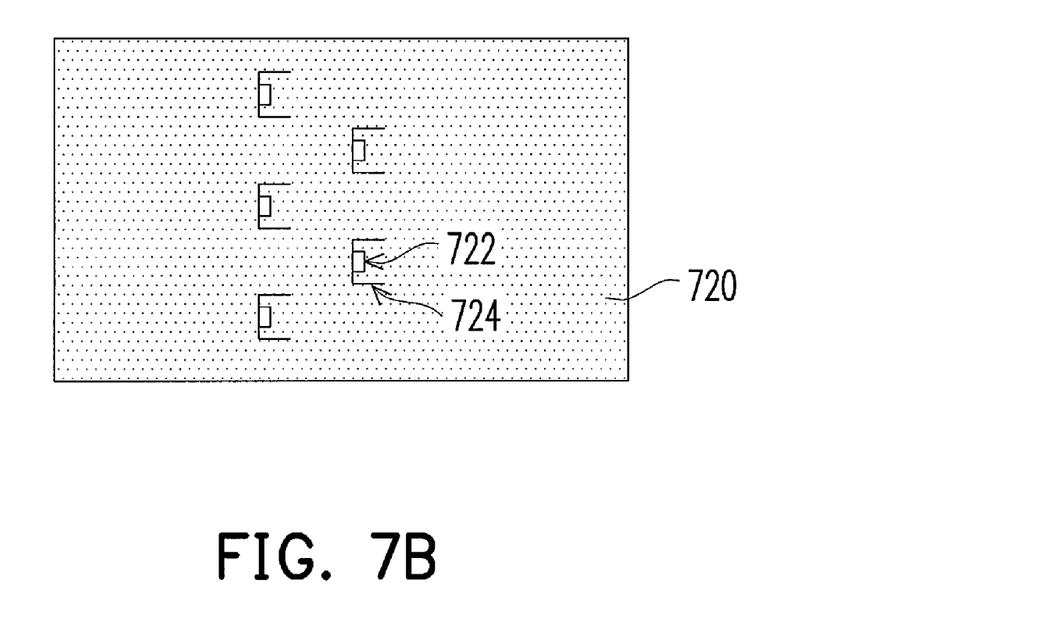

FIGS. 7A and 7B illustrate a back cover and a reflector of a backlight module according to another embodiment of the present invention. Referring to FIGS. 7A and 7B, holes 712 of a back cover 710 are, for example, alternately arranged at respective sides of a virtual straight line. In addition, cutting lines 724 constituting U-shaped traces in a reflector 720 and openings 722 corresponding to the holes 712 are also alternately arranged. Thereby, the back cover 710 and the reflector 720 can be applied to the backlight module having two lamp supporters disposed therein. It is certain that said arrangement by no means limits the scope of the present invention. The holes 712 of the back cover 710 and the openings 722 of the reflector 720 can also be designed in different manners according to other embodiments.

In light of the foregoing, the lamps and the base substrate are disposed at the respective sides of the back cover according to the present invention, and thus the entire reflector can be flatly adhered to the inner face of the back cover. Since the flat reflector is able to enhance the reflection, the light emitted from the lamps can be reflected by the reflector in a uniform manner. As a result, the backlight source provided by the backlight modules in the present invention is capable of emitting uniform light. Meanwhile, the design of the backlight module in the present invention allows the back cover to have the planar inner and outer faces, which contributes to simplification of the fabrication of the back cover.

It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims and their equivalents.

What is claimed is:

1. A backlight module, comprising:
    a back cover, comprising a plurality of holes, an inner face, and an outer face;
    a reflector, disposed on the inner face and having a plurality of openings that expose parts of the holes, wherein other parts of the holes are covered by the reflector;
    a lamp supporter, having a base substrate and a plurality of carriers, wherein the carriers are connected to the base substrate, the base substrate is assembled to the outer face of the back cover, and the carriers pass through the holes of the back cover and the openings of the reflector;
    a plurality of supporting elements, disposed between parts of the carriers, the supporting elements being connected to the base substrate, and each of the supporting elements comprising a post and a neck that is connected between the post and the base substrate, wherein the necks pass parts of the holes of the back cover and parts of the openings of the reflector; and
    a plurality of lamps, disposed in the carriers, such that the lamps and the base substrate are located at two opposite sides of the back cover.

2. The backlight module as claimed in claim 1, wherein each of the carriers comprises a C-shaped clamping member and a connection portion, wherein the connection portions are connected between the base substrate and the C-shaped clamping members and positioned within the holes of the back cover and the openings of the reflector, openings of the C-shaped clamping members are away from the connection portions, and the lamps are disposed within the C-shaped clamping members.

3. The backlight module as claimed in claim 1, wherein the holes are linearly arranged or alternately arranged.

4. The backlight module as claimed in claim 3, wherein each of the holes comprises a first region, a second region, and a third region, the third region is connected between the first region and the second region, and, in an extending direction of an axis of each of the first region, the second region, and the third region, the maximum width of the first region is greater than the maximum width of the second region, the maximum width of the second region being greater than the maximum width of the third region.

5. The backlight module as claimed in claim 1, wherein the reflector further comprises a plurality of cutting lines substantially forming a plurality of U-shaped traces to surround each of the holes, respectively, and the openings are disposed at bottoms of the U-shaped traces.

6. The backlight module as claimed in claim 1, further comprising at least an optical film disposed on the supporting elements.

7. The backlight module as claimed in claim 1, wherein a distance from the centers of the lamps to the reflector is less than 3.2 mm.

8. The backlight module as claimed in claim 1, wherein the inner face and the outer face of the back cover are planar surfaces.

9. The backlight module as claimed in claim 1, wherein the base substrate has a bar shape.

10. The backlight module as claimed in claim 1, wherein the reflector further comprises a plurality of cutting lines and a virtual bending line, the cutting lines and the virtual bending line substantially form a rectangular region to surround all of the holes, and the openings are connected to the rectangular region.

11. The backlight module as claimed in claim 10, wherein the openings are disposed within the rectangular region and correspondingly connected to one of the cutting lines.

12. The backlight module as claimed in claim 10, wherein the openings are disposed outside the rectangular region and correspondingly connected to one of the cutting lines.

* * * * *